United States Patent

Iwaki et al.

[11] Patent Number: 5,293,165
[45] Date of Patent: Mar. 8, 1994

[54] 5B6B CODING RULE INVERSE CONVERSION CIRCUIT FOR DIGITAL TRANSMISSION

[75] Inventors: Hiroyuki Iwaki; Mitsuhiro Kawaguchi; Shuji Miyake; Shuji Yamamoto, all of Osaka, Japan

[73] Assignee: Fujitsu Limited, Kanagawa, Japan

[21] Appl. No.: 787,864

[22] Filed: Nov. 5, 1991

[30] Foreign Application Priority Data

Nov. 9, 1990 [JP] Japan ............................ 2-304523
Mar. 19, 1991 [JP] Japan ............................ 3-054977

[51] Int. Cl.⁵ ............................................ H03M 13/02
[52] U.S. Cl. .................................... 341/102; 341/95; 341/64; 364/715.09
[58] Field of Search ....................... 341/58, 59, 63, 64, 341/71, 73, 93, 95, 102, 103; 364/715.09; 375/19; 371/49.2, 52

[56] References Cited

U.S. PATENT DOCUMENTS

| | | | |
|---|---|---|---|
| 4,189,716 | 2/1980 | Krambeck | 341/63 |
| 4,498,177 | 2/1985 | Larson | 364/715.09 |
| 4,855,742 | 8/1989 | Verboom | 341/102 |

FOREIGN PATENT DOCUMENTS

1023335  6/1983  U.S.S.R. ............................ 371/49.2

Primary Examiner—Howard L. Williams
Attorney, Agent, or Firm—Armstrong, Westerman, Hattori, McLeland & Naughton

[57] ABSTRACT

A circuit for inversely converting the signal of six bits converted by the 5B6B coding rule conversion method in the digital transmission into the original signal of five bits is described. On the occasion of inversely converting the 6-bit signal to the original 5-bit signal, the mark rate of the 6-bit signal to be converted inversely is detected in accordance with the 5B6B coding rule conversion pattern. In this case, all patterns of six bits are not detected but such six bits are divided into the upper three bits and lower three bits and the mark rates of six bits are detected from the patterns of upper three bits and lower three bits. Thereby, a number of detected patterns can be reduced and simplification of circuit structure can also be realized.

3 Claims, 16 Drawing Sheets

Fig. 1 (PRIOR ART)

| original signal (5-bit) | 5B6B code (6-bit) | |
|---|---|---|
| 1 1 0 0 0<br>1 0 1 0 0<br>1 0 0 1 0<br>1 0 0 0 1<br>0 1 1 0 0<br>0 1 0 1 0<br>0 1 0 0 1<br>0 0 1 1 0<br>0 0 1 0 1<br>0 0 0 1 1 | × × × × × 1<br><br>(mark rate 3/6) | |
| 0 0 1 1 1<br>0 1 0 1 1<br>0 1 1 0 1<br>0 1 1 1 0<br>1 0 0 1 1<br>1 0 1 0 1<br>1 0 1 1 0<br>1 1 0 0 1<br>1 1 0 1 0<br>1 1 1 0 0 | × × × × × 0<br><br>(mark rate 3/6) | |
| 1 1 1 1 1<br>1 1 1 1 0<br>1 1 1 0 1<br>1 1 0 1 1<br>1 0 1 1 1<br>0 1 1 1 1<br>1 0 0 0 0<br>0 1 0 0 0<br>0 0 1 0 0<br>0 0 0 1 0<br>0 0 0 0 1<br>0 0 0 0 0 | 1 1 1 0 1 0<br>1 1 0 1 1 0<br>1 0 1 1 1 0<br>1 1 1 0 0 1<br>1 1 0 1 0 1<br>1 0 1 1 0 1<br>0 1 1 1 0 1<br>1 1 0 0 1 1<br>1 0 1 0 1 1<br>0 1 1 0 1 1<br>1 0 0 1 1 1<br>0 1 0 1 1 1 | 0 0 0 1 0 1<br>0 0 1 0 0 1<br>0 1 0 0 0 1<br>0 0 0 1 1 0<br>0 0 1 0 1 0<br>0 1 0 0 1 0<br>1 0 0 0 1 0<br>0 0 1 1 0 0<br>0 1 0 1 0 0<br>1 0 0 1 0 0<br>0 1 1 0 0 0<br>1 0 1 0 0 0 |
| | (mark rate 4/6) | (mark rate 2/6) |

Fig. 4

① mark rate 0/6, 1/6

| D1 | D2 | D3 | | D4 | D5 | D6 |
|----|----|----|---|----|----|----|
| 0 | 0 | 0 | Ⓐ | 0 0 1 | 0 1 0 | 0 0 0 |
| 0 0 0 1 | 0 0 1 0 | 0 1 0 0 | Ⓒ | 0 | 0 | 0 |

② mark rate 5/6, 6/6

| D1 | D2 | D3 | | D4 | D5 | D6 |
|----|----|----|---|----|----|----|
| 1 | 1 | 1 | Ⓑ | 0 1 1 | 1 0 1 | 1 1 0 |
| 0 1 1 1 | 1 0 1 1 | 1 1 0 1 | Ⓓ | 1 | 1 | 1 |

③ mark rate 2/6 (except ⑤)

| D1 | D2 | D3 | | D4 | D5 | D6 |
|----|----|----|---|----|----|----|
| 0 | 0 | 0 | Ⓔ | 1 1 | 0 1 | 1 0 |
| 1 | 0 | 0 | Ⓕ | 0 1 | 1 0 | 0 0 |
| 0 1 | 1 0 | 1 1 | Ⓖ | 0 | 0 | 0 |
| 0 0 | 0 1 | 1 0 | Ⓗ Ⓐ | 0 0 1 | 0 1 0 | 1 0 0 |

④ mark rate 4/6 (except ⑤)

| D1 | D2 | D3 | | D4 | D5 | D6 |
|----|----|----|---|----|----|----|
| 1 | 1 | 1 | Ⓘ | 0 0 | 1 0 | 0 1 |
| 0 | 1 | 1 | Ⓙ | 1 0 | 0 1 | 1 1 |
| 1 0 | 0 1 | 0 0 | Ⓚ | 1 | 1 | 1 |
| 1 1 | 0 1 | 1 0 | Ⓛ Ⓑ | 0 1 1 | 1 0 1 | 1 1 0 |

⑤ mark rate 2/6, 4/6 (not listed in the conversion pattern of Fig. 1)

| D1 | D2 | D3 | D4 | D5 | D6 |
|----|----|----|----|----|----|
| 0 | 0 | 0 | 0 | 1 | 1 |
| 1 | 0 | 0 | 0 | 0 | 1 |
| 1 | 1 | 0 | 0 | 0 | 0 |
| 1 | 1 | 1 | 1 | 0 | 0 |
| 0 | 1 | 1 | 1 | 1 | 0 |
| 0 | 0 | 1 | 1 | 1 | 1 |

Fig. 12

| D1 | D2 | D3 | OR | AND | EOR | 3-bit mark rate |
|----|----|----|----|-----|-----|-----------------|
| 0  | 0  | 0  | 0  | 0   | 0   | 0/3             |
| 0  | 0  | 1  | 1  | 0   | 1   | 1/3             |
| 0  | 1  | 0  | 1  | 0   | 1   | 1/3             |
| 1  | 0  | 0  | 1  | 0   | 1   | 1/3             |
| 0  | 1  | 1  | 1  | 0   | 0   | 2/3             |
| 1  | 0  | 1  | 1  | 0   | 0   | 2/3             |
| 1  | 1  | 0  | 1  | 0   | 0   | 2/3             |
| 1  | 1  | 1  | 1  | 1   | 1   | 3/3             |

Fig. 13

| 6-bit mark rate | combination of 3-bit mark rate |
|---|---|
| 0/6 | 0/3+0/3 |
| 1/6 | 1/3+0/3, 0/3+1/3 |
| 2/6 | 0/3+2/3, 1/3+1/3, 2/3+0/3 |
| 3/6 | 0/3+3/3, 1/3+2/3, 2/3+1/3, 3/3+0/3 |
| 4/6 | 1/3+3/3, 2/3+2/3, 3/3+1/3 |
| 5/6 | 2/3+3/3, 3/3+2/3 |
| 6/6 | 3/3+3/3 |

| input | output |
|---|---|
| 0 0 0 | 0 1 1 1 1 1 1 1 |
| 0 0 1 | 1 0 1 1 1 1 1 1 |
| 0 1 0 | 1 1 0 1 1 1 1 1 |
| 0 1 1 | 1 1 1 0 1 1 1 1 |
| 1 0 0 | 1 1 1 1 0 1 1 1 |
| 1 0 1 | 1 1 1 1 1 0 1 1 |
| 1 1 0 | 1 1 1 1 1 1 0 1 |
| 1 1 1 | 1 1 1 1 1 1 1 0 |

| A | B | XS | XC | 2-bit mark rate |
|---|---|---|---|---|
| 0 | 0 | 1 | 0 | 0／2 |
| 0 | 1 | 0 | 1 | 1／2 |
| 1 | 0 | 0 | 1 | 1／2 |
| 1 | 1 | 1 | 1 | 2／2 |

Fig. 20

| D1~D6 | XC | XS | DS1 | DS2 | 6-bit mark rate |
|---|---|---|---|---|---|
| 0 0 0 0 0 0 | 0 0 0 | 1 1 1 | 0 1 1 1 1 1 1 1 | 1 1 1 1 1 1 1 0 | 0/6 |
| 0 0 0 0 0 1<br>0 0 0 1 0 0<br>0 1 0 0 0 0 | 0 0 1<br>0 1 0<br>1 0 0 | 1 1 0<br>1 0 1<br>0 1 1 | 1 0 1 1 1 1 1 1<br>1 1 0 1 1 1 1 1<br>1 1 1 1 0 1 1 1 | 1 1 1 1 1 1 0 1<br>1 1 1 1 1 0 1 1<br>1 1 1 0 1 1 1 1 | 1/6 |
| 0 0 0 0 1 1<br>0 0 0 1 1 0<br>0 1 1 0 0 0<br>1 1 0 0 0 0 | 0 0 1<br>0 1 1<br>1 1 0<br>1 0 0 | 1 1 1<br>1 0 0<br>0 0 1<br>1 1 1 | 1 0 1 1 1 1 1 1<br>1 1 1 0 1 1 1 1<br>1 1 1 1 1 1 0 1<br>1 1 1 1 0 1 1 1 | 1 1 1 1 1 1 1 0<br>1 1 1 1 0 1 1 1<br>1 0 1 1 1 1 1 1<br>1 1 1 1 1 1 1 0 | 2/6 |
| 1 1 0 0 1 1<br>0 1 1 1 1 0<br>1 0 0 1 1 1 | 1 0 1<br>1 1 1<br>1 1 1 | 1 1 1<br>0 1 0<br>0 0 1 | 1 1 1 1 1 0 1 1<br>1 1 1 1 1 1 1 0<br>1 1 1 1 1 1 1 0 | 1 1 1 1 1 1 1 0<br>1 1 0 1 1 1 1 1<br>1 0 1 1 1 1 1 1 | 4/6 |
| 1 1 1 1 1 0<br>1 1 1 0 1 1<br>1 0 1 1 1 1 | 1 1 1<br>1 1 1<br>1 1 1 | 1 1 0<br>1 0 1<br>0 1 1 | 1 1 1 1 1 1 1 0<br>1 1 1 1 1 1 1 0<br>1 1 1 1 1 1 1 0 | 1 1 1 1 1 1 0 1<br>1 1 1 1 1 0 1 1<br>1 1 1 0 1 1 1 1 | 5/6 |
| 1 1 1 1 1 1 | 1 1 1 | 1 1 1 | 1 1 1 1 1 1 1 0 | 1 1 1 1 1 1 1 0 | 6/6 |

5B6B CODING RULE INVERSE CONVERSION CIRCUIT FOR DIGITAL TRANSMISSION

BACKGROUND OF THE INVENTION

1. Field of the Invention

The present invention relates to a 5B6B coding rule inverse conversion circuit for digital transmission and, in more detail, to improvement of circuit for detecting the mark rate or ratio of 6B code converted by the 5B6B coding rule conversion method.

2. Description of the Prior Art

In general, a self-timing system for extracting the timing wave from the receiving pulse train itself is widely used in a regenerative repeater to be used in digital transmission. In this timing extraction system, the timing information is sometimes lost on the transmission line, in case the input code series is formed by continuation of zero code such as "000 . . . .".

Therefore, in the digital transmission, the 5B6B coding rule conversion is executed to suppress continuation of zero code in order to avoid such disappearance of the timing information. Here, the 5B6B coding rule conversion means that a digital signal train is divided into groups, each consisting of five bits, and this 5-bit signal is converted into the 5B6B code signal of six bits in accordance with the 5B6B coding rule conversion pattern shown in FIG. 1.

At the time of reception, the received digital signal train is divided into groups, each consisting of six bits and the original 5-bit signal can be obtained by inverse conversion of the 5B6B coding rule.

FIG. 2 shows a conventional 5B6B coding rule inverse conversion circuit.

As shown in this figure, the conventional 5B6B coding rule inverse conversion circuit detects a mark rate of the 6-bit signal to be converted inversely and thereafter the 5B6B coding rule inverse conversion is executed reponsive to such detection of mark rate or ratio. Here, a mark rate means the rate of "ON" bit, namely a bit of logic value "1" in the six bits. In the figure, it is indicated as fractions such as 1/6, 2/6. Namely, the conventional 5B6B coding rule inverse conversion circuit is formed by two mark rate detecting circuits 111, 112, one code inverse conversion circuit 113 and two select circuts 114, 115. The first mark rate detecting circuiti 111 detects the mark rates not listed in the conversion pattern of FIG. 1, namely the mark rate 0/6, 1/6, 2/6, 4/6, 5/6 or 6/6 (where, those not listed in the conversion pattern of FIG. 1 for the mark rates 2/6, 4/6) and outputs the signal $S_{88}$ when such mark rate is detected. The second mark rate detecting circuit 112 detects the mark rates listed in the conversion pattern of FIG. 1, that is, the mark rate 2/6, 3/6 or 4/6 and then outputs the signal $S_{86}$ when the mark rate is 2/6 or 4/6 and also outputs the signal $S_{87}$ when the mark rate is 3/6. The code inverse conversion circuit 113 converts inversely the signal $S_{81}$ of the six bits, D1~D6 by the 5B6B coding rule inverse conversion method when the signal $S_{86}$ is outputted from the second mark rate detecting circuit 112 and then outputs such converted signal as the signal $S_{82}$ of the five bits. The first select circuit 114 usually outputs the signal $S_{82}$ as the signal $S_{83}$ and outputs the signal $S_{85}$ (the 5-bit signal from D1 to D5) as the signal $S_{83}$ when the signal $S_{87}$ is outputted from the second mark rate detecting circuit 112. The second select circuit 115 usually outputs the signal $S_{83}$ as the signal $S_{84}$ and outputs the 5-bit digital signal "10101" as the signal $S_{84}$ when the signal $S_{88}$ is outputted from the first mark rate detecting circuit 111.

As explained above, in the conventional 5B6B coding rule inverse conversion circuit, the mark rate of the 6-bit 5B6B code signal is detected. When the mark rate is 2/6, 3/6 or 4/6, the 6B6B coding rule inverse conversion is executed in accordance with the conversion pattern of FIG. 1. When the mark rate is 0/6, 1/6, 2/6, 4/6 or 6/6, the 6-bit 6B6B code signal is converted to the 5-bit signal "10101". Those not listed in the conversion pattern of FIG. 1 correspond to the mark rates 2/6 and 4/6.

However, such conventional 5B6B coding rule inverse conversion circuit provides a disadvantage that the scale of circuit becomes large and many redundant circuits are included because the mark rate is detected for all patterns of 6-bit signal (64 patterns) for detection of each mark rate by first mark rate detecting circuit 111 and the second mark rate detecting circuit 112.

SUMMARY OF THE INVENTION

It is an object of the present invention to provide a 5B6B coding rule inverse conversion circuit which has simplified the circuit structure by reducing a number of patterns for detection of mark rate.

Briefly, the 5B6B coding rule inverse conversion circuit of the present invention comprises a composition including a first decoder for generating the signal of eight patterns from the upper three bits in the six bits signal which has been converted by the 5B6B coding rule conversion method, a second decoder for generating a signal of eight patterns from the lower three bits in the six bits, a mark rate detecting circuit for detecting a mark rate of six bits from the signal of eight patterns from the first and second decoders, a code inverse conversion circuit for converting the six bits into the 5-bit signal by the 5B6B coding rule inverse conversion responsive to the mark rate detected by the mark rate detecting circuit and a select circuit for selecting and outputting any one signal among the 5-bit signal converted inversely by the code inverse converting circuit, signal of upper five bits in the six bits and error signal, responsive to the mark rate detected by the mark rate detecting circuit.

Other objects and features of the present invention will be further understood from the description of the preferred embodiment with reference to the accompanying drawings.

BRIEF DESCRIPTION OF THE DRAWINGS

FIG. 1 is a diagram for explaining conventional conversion pattern of the 5B6B coding rule;

FIG. 4 is a diagram for indicating a mark rate in each bit pattern by the first embodiment;

FIG. 12 is a diagram indicating relationship between logical values of the first mark rate detecting circuit and mark rate of three bits;

FIG. 13 is a diagram indicating relationship between result of combination of mark rate of three bits and mark rate of six bits shown in FIG. 12;

FIG. 20 is a diagram for explaining operation of the 6-bit mark rate deciding circuit.

DESCRIPTION OF THE PREFERRED EMBODIMENTS

Three embodiments of the present invention will be explained with reference to the accompanying drawings.

Figure 2:
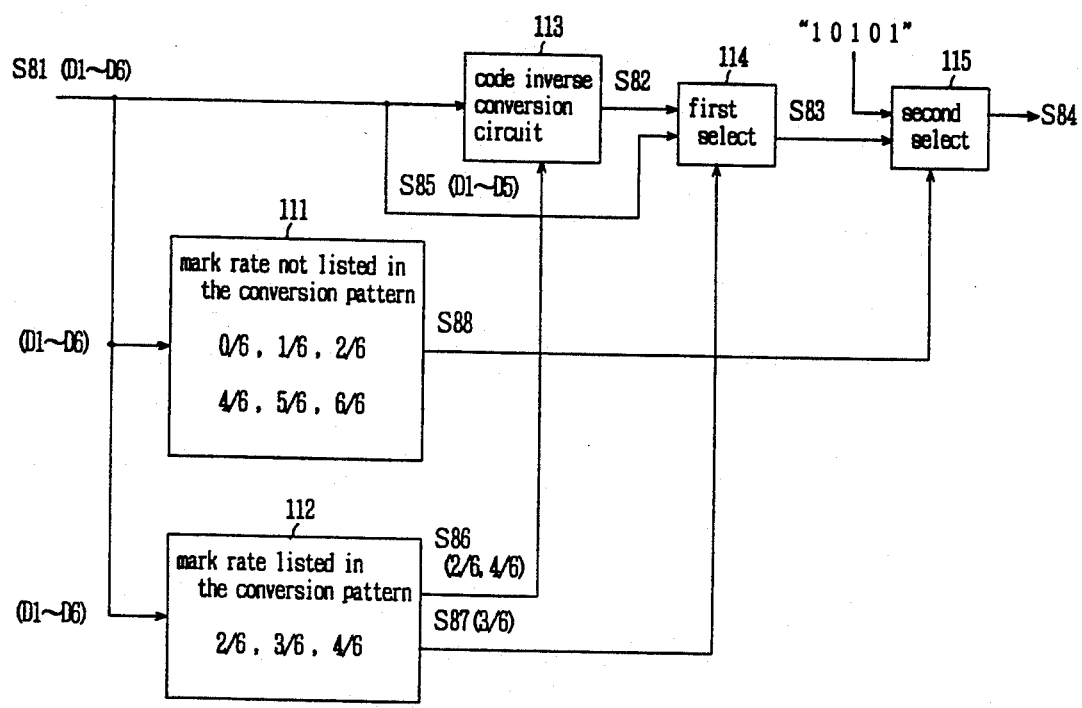
FIG. 2 is a diagram indicating the conventional 5B6B coding rule inserve conversion circuit.
Figure 3:
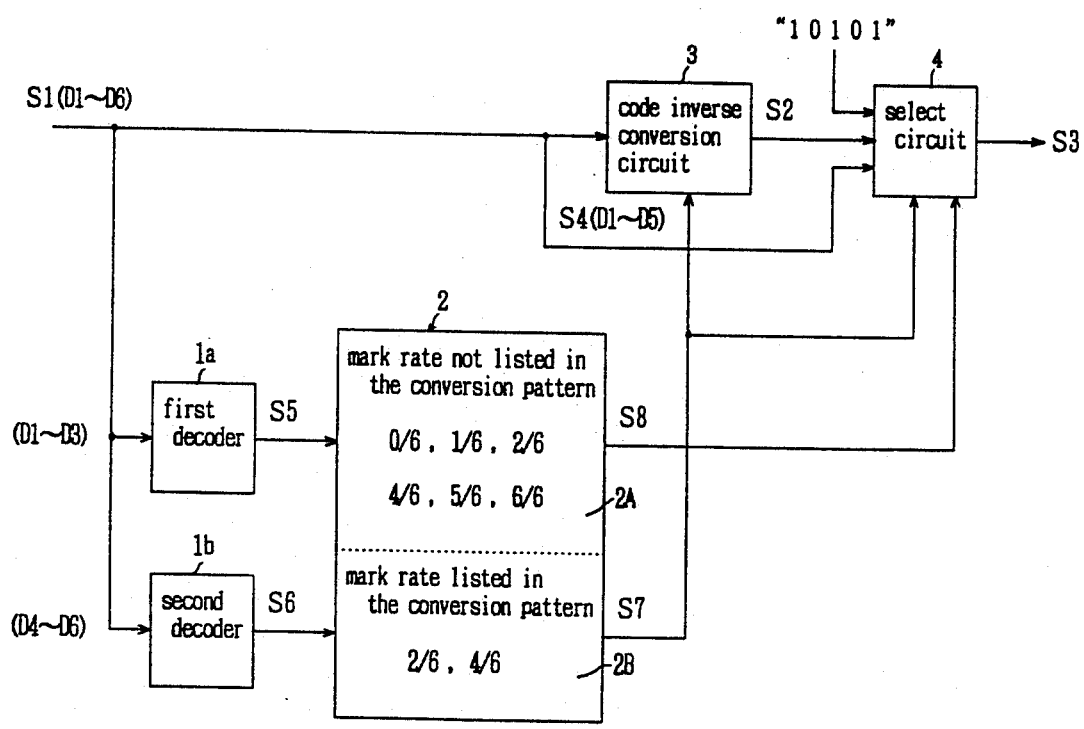
FIG. 3 is a block diagram for explaining a first embodiment of the 5B6B coding rule inverse conversion circuit of the present invention.

FIG. 3 is a block diagram schematically indicating a 5B6B coding rule inverse conversion circuit as the first embodiment. In this FIG., $1a$ and $1b$ denote a first and a second 3-line to 8-line decoder/demultiplexer (hereinafter abbreviated as 3:8 decoder); 2, a mark rate detecting circuit; 3, a code inverse conversion circuit; 4, a select circuit.

The first 3:8 decoder $1a$ generates a converted signal $S_5$ of eight patterns from the upper three bits $D_1 \sim D_3$ in the signal $S_1$ of six bits $D_1 \sim D_6$ converted by the 5B6B coding rule conversion method. The second 3:8 decoder $1b$ generates a converted signal $S_6$ of eight patterns from the lower three bits $D_4 \sim D_6$ in the signal $S_1$ of six bits.

The mark rate detecting circuit 2 outputs, when the mark rate, namely 2/6 or 4/6, listed in the 5B6B coding rule conversion pattern of FIG. 1 is detected, the signal $S_7$ and also outputs, when the mark rate, namely, 0/6, 1/6, 2/6, 4/6, 5/6 or 6/6, not listed in the conversion pattern of FIG. 1 is detected, the signal $S_8$. The mark rates 2/6, 4/6 correspond to those not listed in the conversion pattern of FIG. 1.

The code inverse conversion circuit 3 inversely converts, when the mark rate detecting circuit 2 outputs the signal $S_7$, the input signal $S_1$ by the 5B6B coding rule inverse conversion method based on the conversion pattern of FIG. 1 and outputs the signal as the 5-bit signal $S_2$.

The select circuit 4 selects and outputs three kinds of signals, responsive to output content of the mark rate detecting circuit 2. Namely, when the signal $S_7$ is outputted from the mark rate detecting circuit 2, the select circuit 4 outputs in direct the output signal $S_2$ of the code inverse conversion circuit 3 as the signal $S_3$. When the signal $S_8$ is outputted from the mark rate detecting circuit 2, the select circuit 4 outputs the preset 5-bit signal "10101" as the signal $S_3$. When both the signals $S_7$ and $S_8$ are not outputted from the mark rate detecting circuit 2, the mark rate is considered as 3/6, the select circuit 4 outputs the signal $S_4$ (5-bit signal $D_1 \sim D_5$) as the signal $S_3$.

As explained above, in this embodiment, the 6-bit 5B6B code signal $S_1$ is divided into groups of three bits and the first and second 3:8 decoders $1a$, $1b$ generate the converted signals $S_5$, $S_6$ of 16 patterns (eight patterns ×2). The mark rate detecting circuit 2 detects all patterns (44 patterns) of the mark rate other than 3/6 and classifies such patterns into the signals, not listed in the conversion pattern shown in FIG. 1, namely the error signal $S_8$ and the signal $S_7$ listed in the conversion pattern of FIG. 1, and the select circuit 4 selects the signal $S_2$ when the signal $S_7$ is detected, or the signal "10101" when the signal $S_8$ is detected, or the signal $S_4$ when both signals $S_7$ and $S_8$ are not detected, to output the 5-bit signal $S_3$ Thereby, the mark rate detecting circuit 2 is not required to detect the mark rate 3/6. Moreover, use of the first and second 3:8 decoders $1a$, $1b$ realizes combination of numerals in detection of mark rate as shown in ①~⑤ of FIG. 4.

Since the mark rate detecting circuit 2 detects the mark rate with the 3-bit signals of $D_1 \sim D_3$ and $D_4 \sim D_6$, patterns are overlapped like the patterns (A)~(L) of each bit patern shown in FIG. 4. It indicates that when the signal of three bits $D_1 \sim D_3$ is "000", if the signal of three bits $D_4 \sim D_6$ is any one of the (A) pattern ("001", "101", "100"), the mark rate becomes 1/6, and when the signal of three bits $D_1 \sim D_3$ is any one of the (H) pattern ("001", "010"), if the signal of three bits $D_4 \sim D_6$ is any one of the (A) pattern, the mark rate becomes 2/6.

As explained above, the mark rate detecting circuit 2 has a circuit composition suitable for simplification so that when the (A) pattern is detected, as indicated by ①~⑤ of FIG. 4, if the signal of three bits $D_1 \sim D_3$ is "000", the mark rate is 1/6 and if the (H) pattern is detected, the mark rate is 2/6.

Since the mark rates 2/6 and 4/6 show the same pattern if "1" and "0" are inverted as shown in the conversion pattern of FIG. 1, the code inverse conversion circuit 3 inputs in direct the 6-bit signal $S_1$ when the mark rate 2/6 is detected and inputs the signal $S_1$ after polarity inversion when the mark rate is 4/6. For inverse conversion to 5-bit from 6-bit, the inverse conversion is executed by detecting only the pattern with the mark rate 2/6. In this case, since the number of "1" is two when the mark rate is 2/6, the inverse conversion is executed easily in the circuit depending on the position of "1".

In the select circuit 4, five 3-line to 1-line type select circuits (hereinafter abbreviated as 3:1 select circuit) are used in place of 10 conventional 2-line to 8-line type select circuits. This select circuit 4 is necessary for all five bits of the output signal $S_3$ and two stages of select circuits have been employed. Therefore the circuit scale has been large. But, use of the 3:1 select circuit has realized scale-down of circuit structure and reduction of redundant circuits.

The paractical composition of each circuit will be explained with reference to FIG. 3~FIG. 7.

Figure 5:
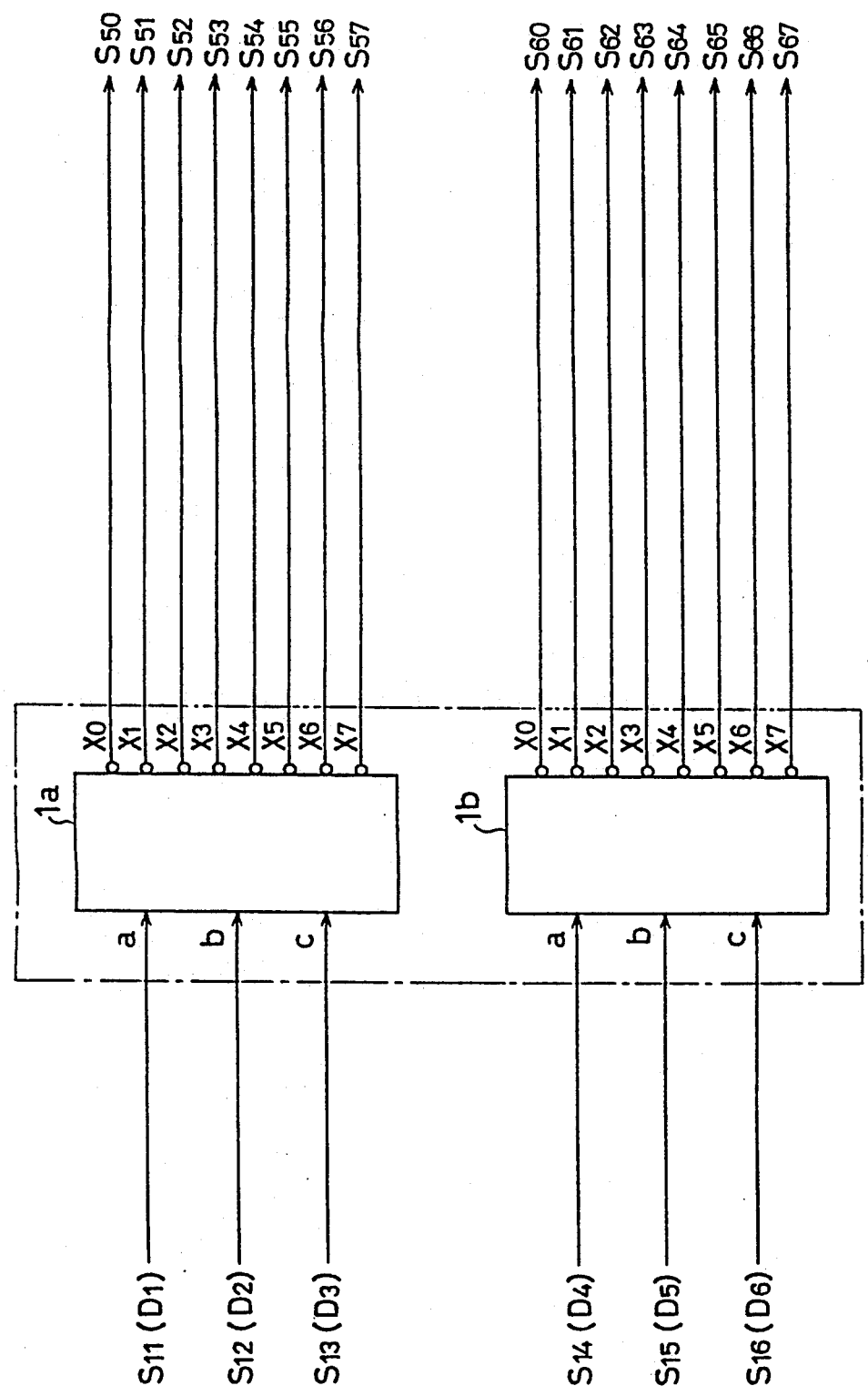
FIG. 5 is a circuit diagram indicating a practical example of a first and second 3:8 decoders of FIG. 3.

FIG. 5 is a circuit diagram of the first and second 3:8 decoders $1a$, $1b$. As shown in this figure, the 5B6B code signals $S_{11} \sim S_{18}$ of six bits $D1 \sim D6$ are inputted in unit of thre bits and are then converted into the signals $S_{50} \sim S_{57}$ and $S_{60} \sim S_{67}$ of eight patterns.

Figure 6:
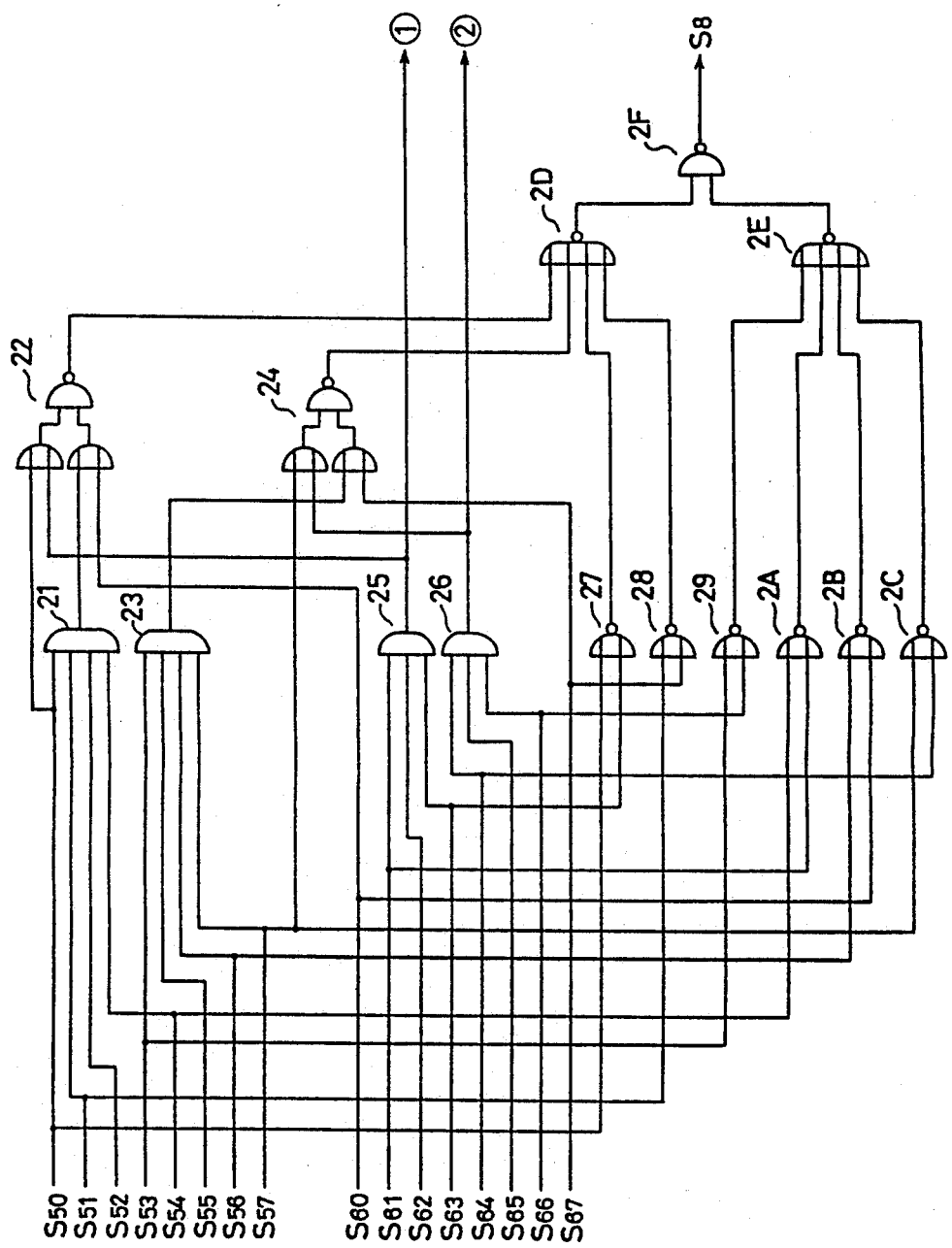
FIG. 6 and FIG. 7 are circuit diagrams indicating a practical example of the mark rate detecting circuit of FIG. 3.

FIG. 6 indicates a circuit diagram of the part 2A for detecting the mark rates 0/6, 1/6, 2/6, 4/6, 5/6, 6/6 of the mark rate detecting circuit 2.

In this figure, the mark rates 0/6, 1/6 indicated by ① of FIG. 4 are detected by respectively inputting the output signal of the AND circuit 25 for detecting (A) pattern of FIG. 4 and the output signal $S_{50}$ of decoder 1a, and also inputting the output signal of AND circuit 21 for detecting (C) pattern of FIG. 4 and the output signal $S_{60}$ of decoder 1b to the NAND circuit 22.

The mark rates 5/6, 6/6 indicated by ② of FIG. 4 are detected by respectively inputting the output signal of AND circuit 26 for detecting (B) pattern of FIG. 4 and the output signal $S_{57}$ of decoder also inputting the output signal of AND circuit 23 for detecting (D) pattern of FIG. 4 and the output signal $S_{67}$ of decoder 1b to the NAND circuit 24.

The mark rates 2/6, 4/6 indicated by ⑤ of FIG. 4 are detected by respectively inputting the signals $S_{50}$, $S_{63}$, signals $S_{51}$, $S_{67}$, signals $S_{53}$, $S_{66}$, signals $S_{54}$, $S_{61}$, signals $S_{56}$, $S_{60}$ ans signals $S_{57}$, $S_{64}$ to the NOR circuits $27 \sim 2C$.

The mark rates 0/6, 1/6, 2/6, 4/6, 5/6, 6/6 not listed in the conversion pattern of FIG. 1 are detected as the error by the NOR circuit 2D, NOR circuit 2E and NAND circuit 2F and the error detection signal $S_8$ is outputted.

Figure 7:
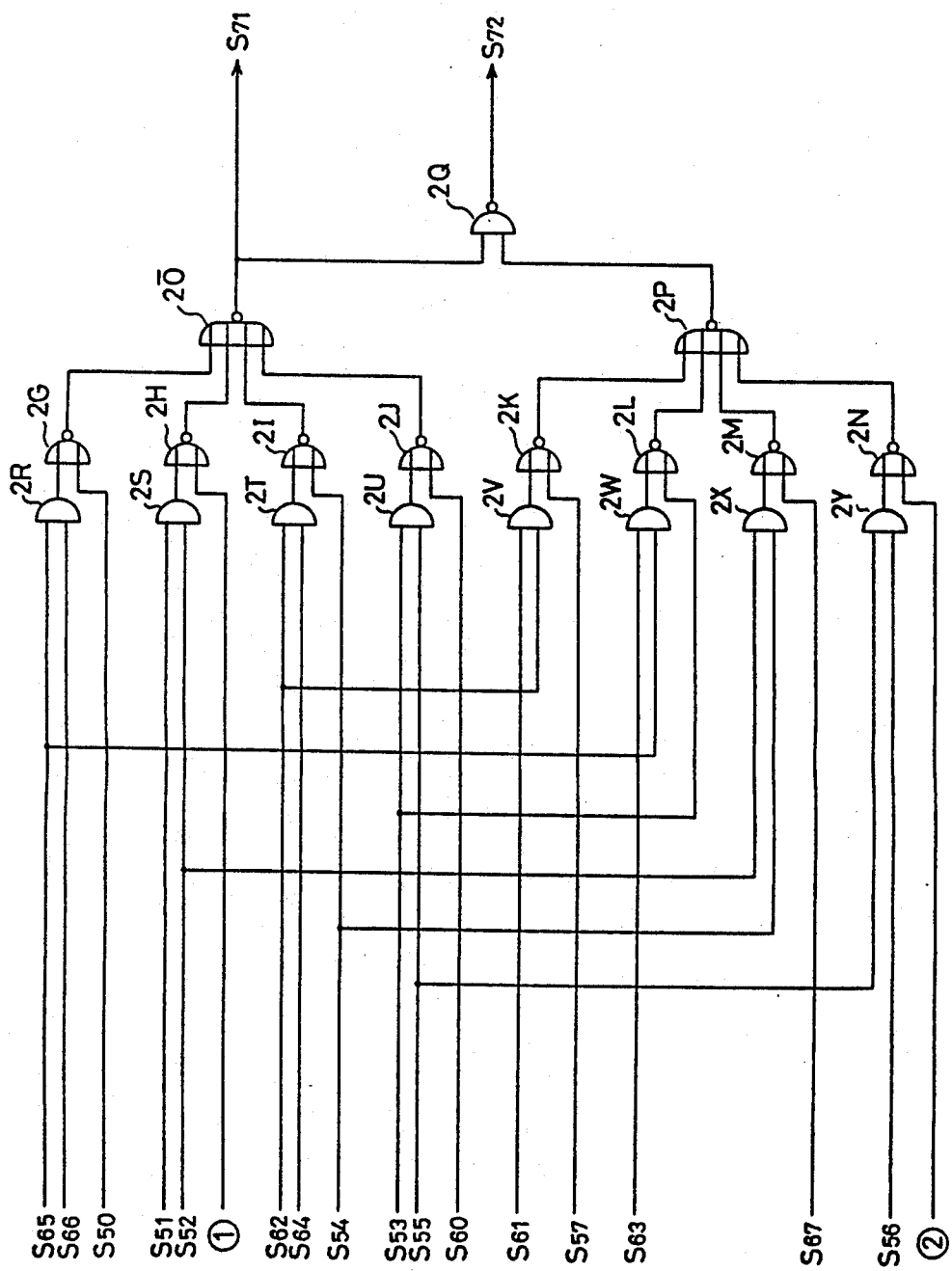

FIG. 7 is an electrical circuit of the part 2B for detecting the mark rates 2/6 and 4/6 of the mark rate detecting circuit 2.

In this circuit, the mark rate indicated by ③ of FIG. 4 is detected as explained hereunder. Namely, the patterns (E)~(H) of FIG. 4 are detected by four AND circuits $2R \sim 2U$. In practical, the pattern (E) is detected by inputting the signals $S_{65}$ and $S_{66}$ to the AND circuit 2R, the pattern (F) is detected by inputting the signals $S_{62}$ and $S_{64}$ to the AND circuit 2T, the pattern (G) is detected by inputting the signals $S_{53}$ and $S_{55}$ to the AND circuit 2U and the pattern (H) is detected by inputting the signals $S_{51}$ and $S_{52}$ to the AND circuit 2S.

Next, after each pattern is detected by inputting these pattern signals of (E)~(H), signal $S_{50}$, signal ①, signal $S_{54}$, signal $S_{60}$ of FIG. 6 to the four NOR circuits $2G \sim 2J$, thee signals are then inputted to the NOR circuit 20 to output the detected signal $S_{71}$ with mark rate 2/6.

Moreover, the mark rate 4/6 indicated by ④ of FIG. 4 is detected as explained hereunder. That is, four AND circuits $2V \sim 2Y$ detect the patterns (I)~(L) of FIG. 4. In practical, the (I) pattern is detected by inputting the signals $S_{61}$ and $S_{62}$ to the AND circuit 2V, the (J) patern by inputting the signals $S_{63}$ and $S_{65}$ to the AND circuit 2W, the (K) pattern by inputting the signals $S_{52}$ and $S_{54}$ to the AND circuit 2X and the (L) pattern by inputting the signals $S_{55}$ and $S_{56}$ to the AND circuit 2Y.

Next, after each pattern is detected by inputting these (I)~(L) patterns, signal $S_{57}$, signal ②, signals $S_{53}$, $S_{67}$ of FIG. 6 to four NOR circuits $2K \sim 2N$, the mark rate 4/6 is detected by inputting these signals to the NOR circuit 2P. The detected sisgnal $S_{72}$ of the mark rates 2/6 and 4/6 is also outputted by inputting the detected signal $S_{71}$ of mark rate 2/7 and the detected signal of mark rate 4/6 to the NAND circuit 2Q.

Figure 8:
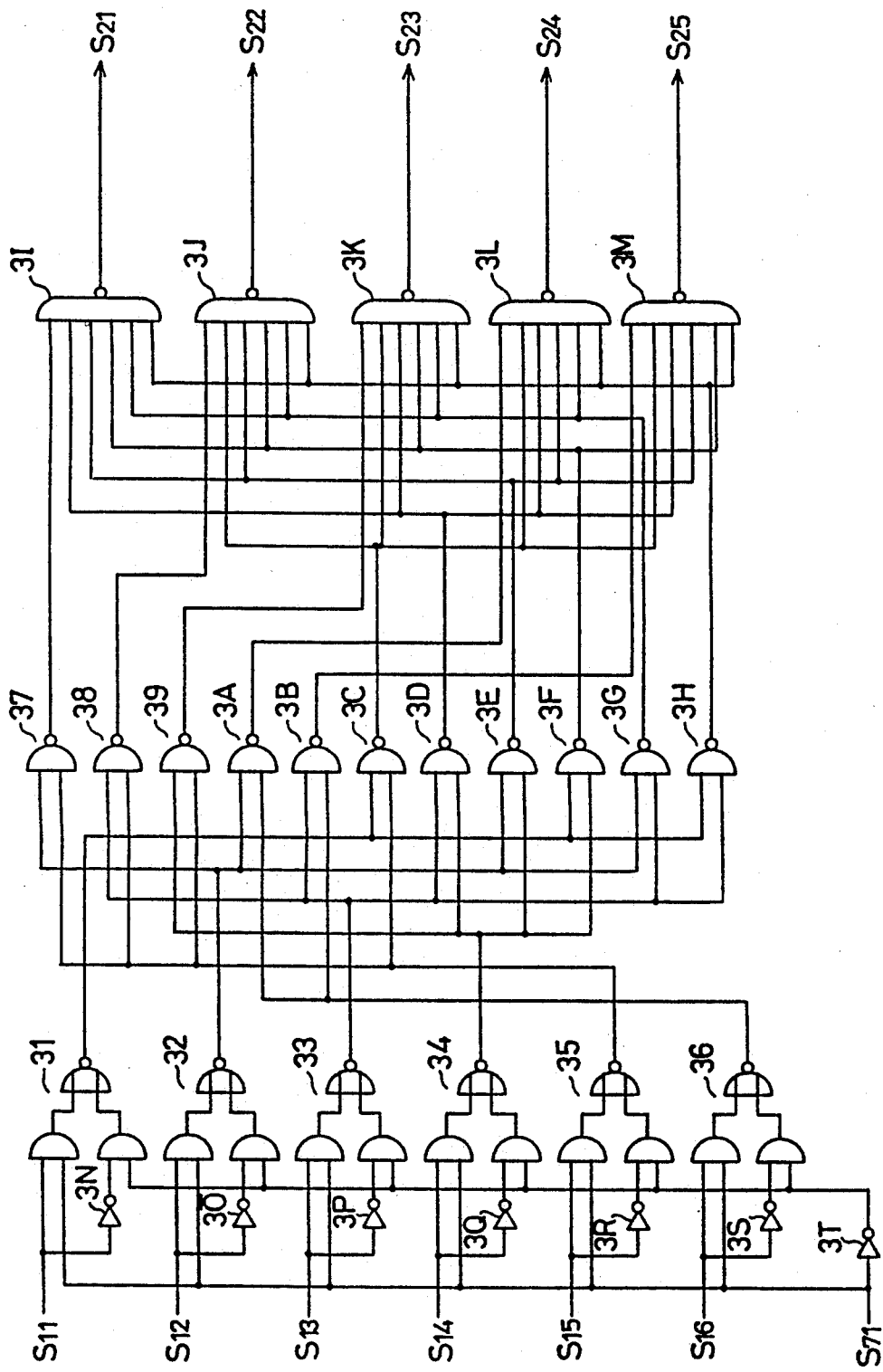
FIG. 8 is a circuit diagram indicating a practical example of a code inverse conversion circuit of FIG. 3.

FIG. 8 is a circuit diagram indicating a practical example of a code inverse conversion circuit 3.

In this circuit, since the bit patterns of mark rates 2/6 and 4/6 are same as explained above by inverting "1" and "0". Accordingly, if the detected signal $S_{71}$ of the mark rate 2/6 is "0", the signal of positive logic is outputted from the 5B6B code signals $S_{11} \sim S_{16}$ of six bits by the inverter circuits 3N 3S and select circuits 31 36. Moreover, when the detected signal $S_{71}$ of the mark rate 2/6 is "1", the mark rate is changed to 2/6 when the select circuits $31 \sim 36$ output the negative logic signal. That is, since the patterns having the mark rates other than 2/6 and 4/6 can be neglected without 5B6B coding rule conversion, it is necessary to detect only each bit pattern of the mark rate 2/6.

Detection of individual bit pattern of mark rate 2/6 is executed responsive to the position of a couple of "1" in the 5B6B code signals $S_{11} \sim S_{16}$ of six bits. This detection is carried out by the NAND circuits $37 \sim 3H$ and this NAND circuit $37 \sim 3H$ also output the signals $S_{21} \sim S_{25}$ converted in the NAND circuits $3I \sim 3M$ by the detected pattern.

Only 11 patterns among 12 patterns having the mark rate 2/6 are detected because detection of all patterns is not required since when "000101" is not detected, all NAND circuits $37 \sim 3H$ output "1" and the NAND circuits $3I \sim 3M$ output "0".

Figure 9:
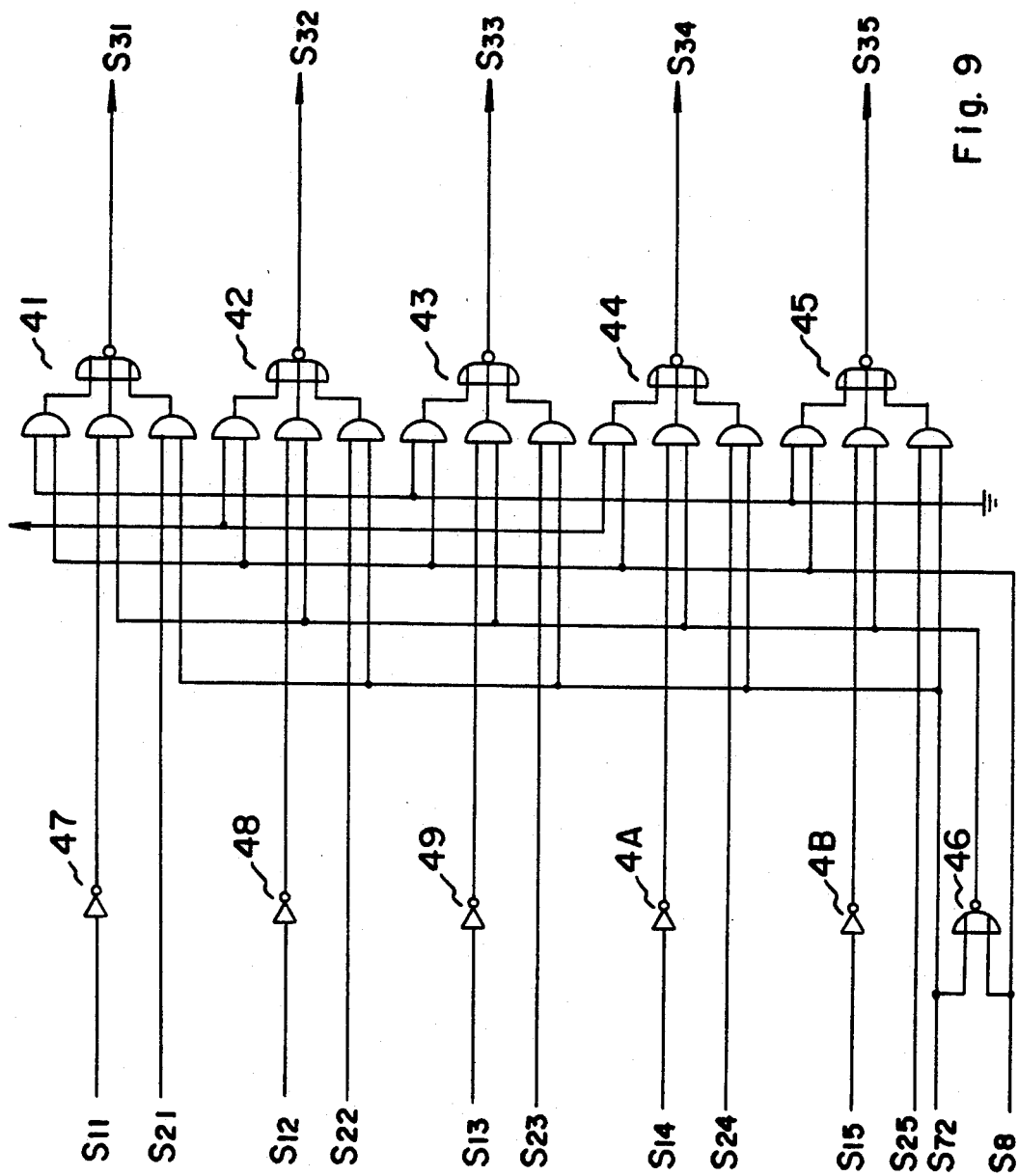
FIG. 9 is a circuit diagram indicating a practical example of a select circuit of FIG. 3.

FIG. 9 is a detail circuit diagram of the select circuit 4. As shown in this figure, the select circuits $41 \sim 45$ are controlled by a couple of control signals. The one control signal is the detected signal $S_{72}$ of the mark rates 2/6 and 4/6 explained above and the other control signal is the error detection signal $S_8$ explained above.

Here, when the one control signal $S_{72}$ is "1", the signals $S_{21} \sim S_{25}$ converted by the 5B6B coding rule inverse conversion are selected. When the other control singal $S_8$ is "1", the error signal "10101" is selected. When both control signals $S_8$ and $S_{72}$ are "0", the signals $S_{11} \sim S_{15}$ are selected. Thereby, five select circuits $41 \sim 45$ output the signals $S_{31} \sim S_{35}$ Next, the second embodiment of the present invention will be explained with reference to FIG. 10 to FIG. 14.

Figure 10:
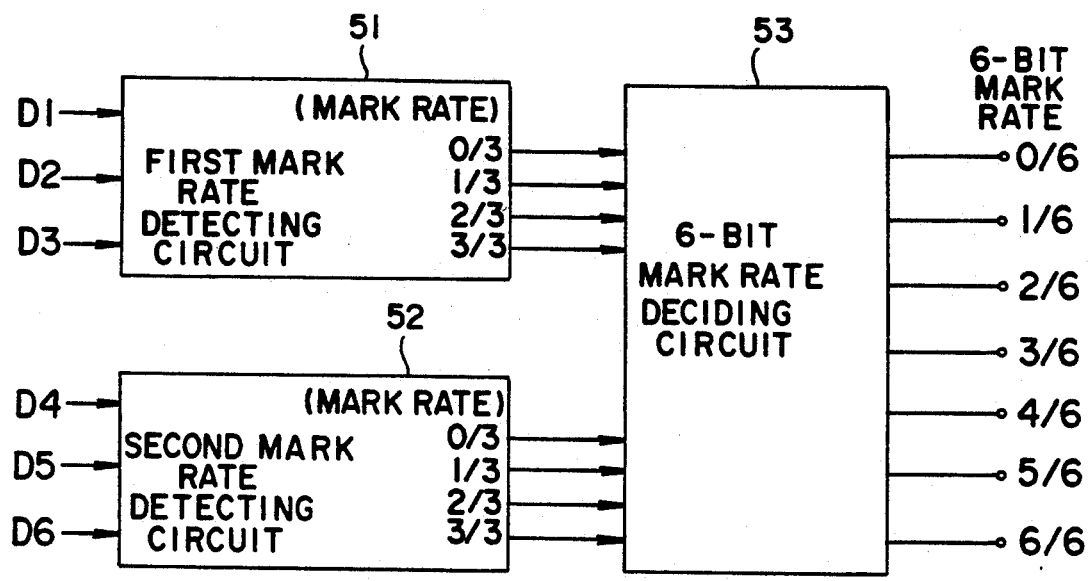
FIG. 10 is a block diagram for explaining a second embodiment of the present invention.

FIG. 10 is a diagram for explaining the fundamental composition of the second embodiment of the present invention.

As shown in FIG. 10, the 5B6B coding rule inverse conversion circuit of this embodiment comprises a first mark rate detecting circuit 51 for detecting the mark rate of upper three bits $D1 \sim D3$, a second mark rate detecting circuit 52 for detecting mark rate of lower three bits $D4 \sim D6$ and a 6-bit mark rate deciding circuit 53 for deciding the mark rate of six bits $D1 \sim D6$ from the mark rate detected by the first and second mark rate detecting circuits 51, 52. This embodiment shows only the circuit portion for detecting the mark rate of six bits.

Namely, in this embodiment, the 5B6B code signal of six bits $D1 \sim D6$ is divided into two groups of three bits as in the case of the preceding embodiment. In this case, logical sum (OR), logical product (AND) and exclusive logical sum (EOR) are taken for individual three bits without using the 3:8 decoder in order to detect respective mark rates.

Figure 11:
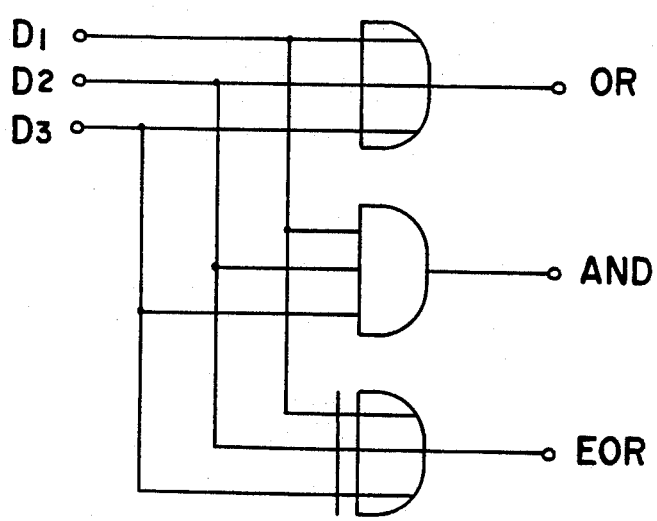
FIG. 11 is a circuit diagram indicating a practical example of a first mark rate detecting circuit of FIG. 10.

These logical circuits are shown in FIG. 11 and logical values are shown in FIG. 12. From output of the logical circuits of FIG. 11, the mark rate of three bits can be detected as shown in FIG. 12 as explained hereunder.

Namely, the mark rate of three bits can be detected under the conditions:

① the mark rate is 0/3 when a value of OR circuit is "0";

② the mark rate is 1/3 when a value of OR circuit is "1", a value of AND circuit is "0" and a value of EOR circuit is "1";

③ the mark rate is 2/3 when a value of OR circuit is "1", a value of AND circuit is "0" and a value of EOR circuit is "0";

④ the mark rate is 3/3 when a value of AND circuit is "1".

The mark rate of six bits as shown in FIG. 13 can be obtained from combination of the mark rates. For example, the mark rate 0/6 of six bits can be obtained from combination, for example, of the mark rate 0/3 of upper three bits and the mark rate 0/3 of lower three bits. Moreover, the mark rate 3/6 of six bits can be obtained from combination of the mark rate 0/3 of upper three bits and the mark rate 3/3 of lower three bits. In the same manner, the mark rate 6/6 of six bits can be obtained from combination of the mark rate 3/3 of upper three bits and the mark rate 3/3 of lower three bits.

Figure 14:
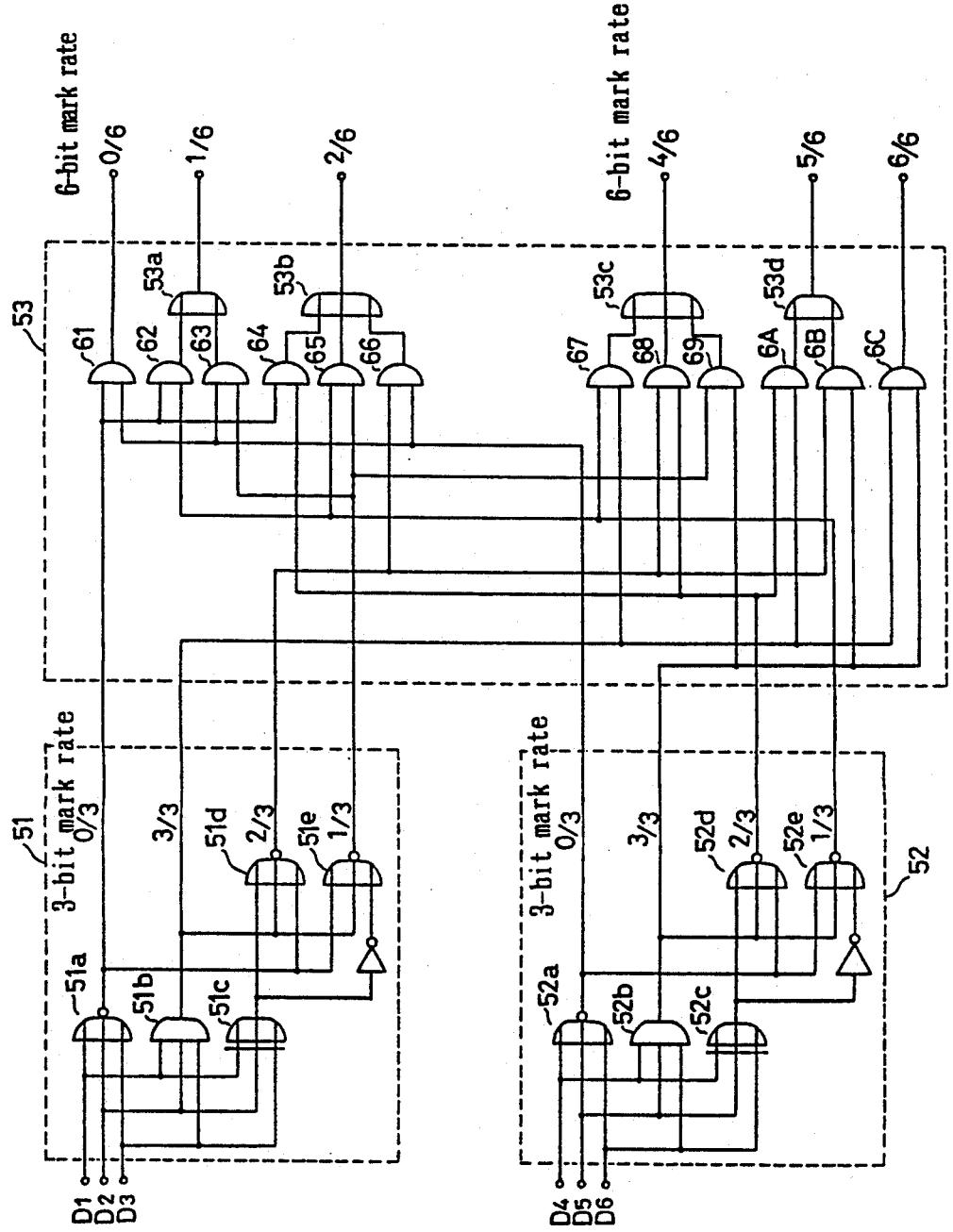
FIG. 14 is a diagram indicating a practical circuit composition of the second embodiment.

FIG. 14 shows a practical example of the circuit shown in FIG. 10. In this circuit, the circuits enclosed by broken lines respectively correspond to the circuits shown in FIG. 10. The first mark rate detecting circuit 51 is formed by a NOR circuit 51a, an AND circuit 51b, an EOR circuit 51c, a NOR circuit 51d and a NOR circuit 51e. The second mark rate detecting circuit 52 is formed by a NOR circuit 52a, an AND circuit 52b, an EOR circuit 52c, a NOR circuit 52d and a NOR circuit 52e. These two mark rate detecting circuits 51 and 52 are similar in function to so-called half-adder circuits, except that three inputs are provided to each of circuits 51 and 52 (D1–D3 for circuit 51, and D4–D6 for circuit 52), rather than two inputs which are conventionally known in the case of a half-adder.

Moreover, a 6-bit mark rate deciding circuit 53 is formed by 12 AND circuits 61~69, 6A~6C and four OR circuits 53a, 53b, 53c, 53d.

As explained above, also in the second embodiment, the 6-bit 5B6B code signal is divided into the upper three bits and lower three bits and the mark rate of the 5B6B code signal is detected from these patterns. Thereby, a number of detected patterns can be reduced in number and the circuit composition can be scaled down more than that of the conventional circuit.

Next, the third embodiment as a modification of the second embodiment explained above will then be explained. In this third embodiment, the 6-bit 5B6B code signal is divided in unit of two bits. The signals of upper and intermediate and lower two bits are respectively applied to a mark rate detecting circuit (such as circuits 51 and 52 of FIG. 14) to detect the mark rate signal of two bits. Next, the upper bits signal and lower bits signal of the mark rate signals of these two bits are respectively inputted to different 3:8 decoders so that these decoders generate respectively the converted signals of eight patterns. Finally, the converted signals of 16 patterns (eight patterns×2) are inputted to the 6-bit mark rate deciding circuit to detect the mark rate of six bits.

Figure 15:
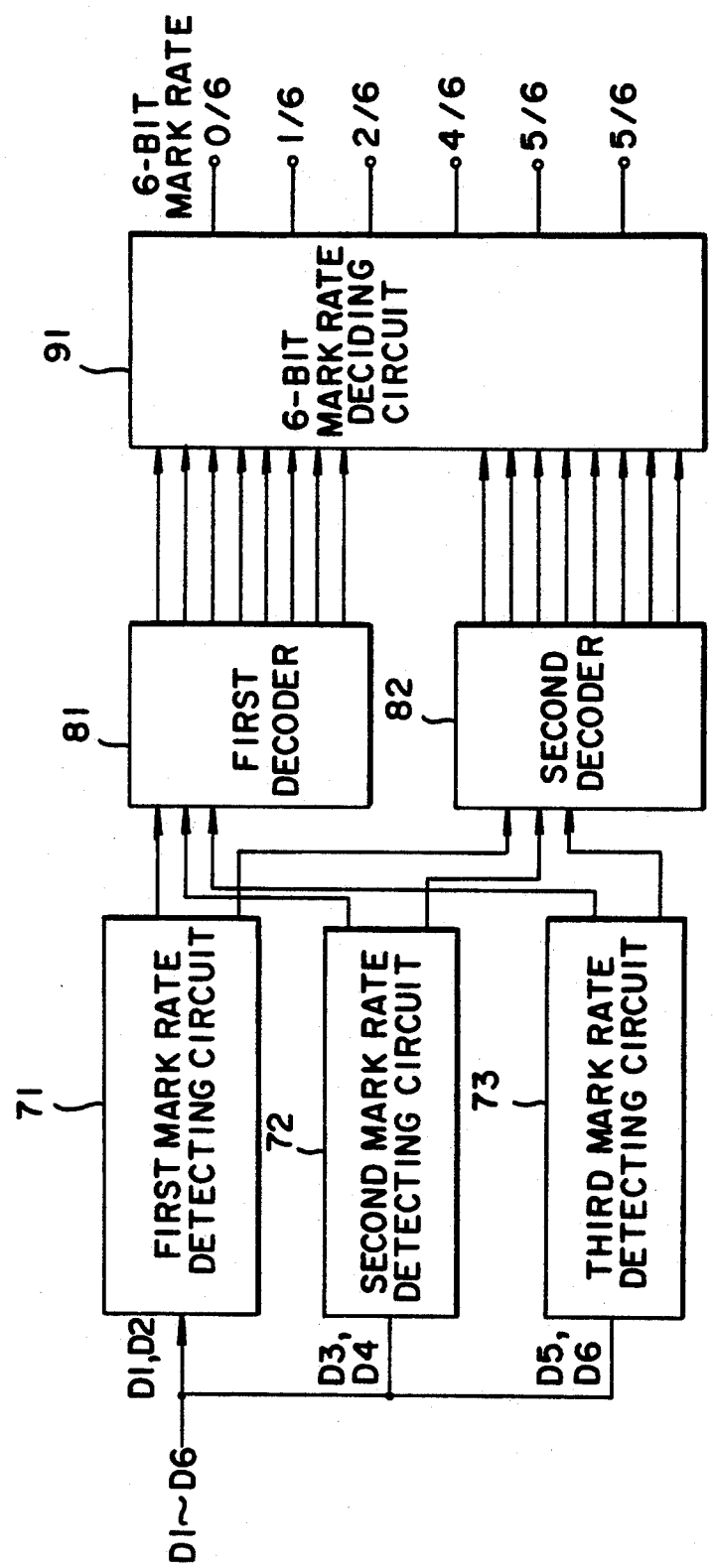
FIG. 15 is a block diagram for explaining a third embodiment of the present invention.

FIG. 15 is a block diagram indicating a fundamental structure of a third embodiment. In this figure, 71, 72, 73 denote a first, a second and a third mark rate detecting circuit; 81, 82, a first and a second 3:8 decoders; 91, a 6-bit mark rate deciding circuit.

The signals of upper two bits D1, D2 among the 5B6B code signals of D1~D6 are inputted to the first mark rate detecting circuit 71, the signals of intermediate two bits D3, D4 are inputted to the second mark rate detecting circuit 72 and the signals of lower two bits D5, D6 are inputted to the third mark rate detecting circuit half-adder 73, respectively. These three mark rate detecting circuit 71, 72, 73 have the same circuit structure and therefore the circuit of the first mark rate detecting circuit 71 is representatively shown in FIG. 16. As shown in this figure, a mark rate detecting circuit is formed by an exclusive NOR circuit 711 and an OR circuit 712. These circuits make logical sum (OR) of the signals of upper two bits D1, D2 to be applied to a couple of input terminals A, B and detect the mark rate of two bits from combination of logical values outputted from the output terminals XS, XC of both circuits.

Figures 16, 17, 18:
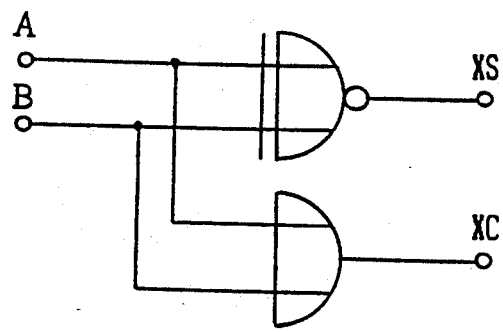
FIG. 16 is a circuit diagram indicating a practical example, of a half-adder shown in FIG. 15.
FIG. 17 is a diagram indicating relationship between logical values of the half-adder and mark rate of two bits.
FIG. 18 is a diagram indicating logical values of input and output of decoders shown in FIG. 15.

FIG. 17 is a diagram indicating logical values of input and output of decoder 81 and 82. As can be understood from this figure for example, when the signals of upper two bits D1, D2 are respectively "0", the 2-bit mark rate 0/2 is detected. When both D1, D2 are "1", the 2-bit mark rate 2/2 is detected. In other cases, the 2-bit mark rate 1/2 is detected. Here, the logical value signal of output terminal XS of mark rate detecting circuit is defined as the upper bit signal of 2-bit mark rate signal and the logical value signal of output terminal XC as the lower bit signal thereof for the convenience of explanation.

The first 3:8 decoder 81 respectively inputs the upper bit signal among 2-bit mark rate signals outputted from three mark rate detecting circuits 71~73 and outputs the logical value signal DS1 of eight patterns by demultiplexing the input 3-bit logical value signals. The second 3:8 decoder 82 respectively inputs the lower bit signal among 2-bit mark rate signals and outputs the logical value signal DS$_2$ of eight patterns. FIG. 18 is a diagram indicating the relationship between logical values of the mark rate detecting circuits and the two bits mark rate.

Figure 19:
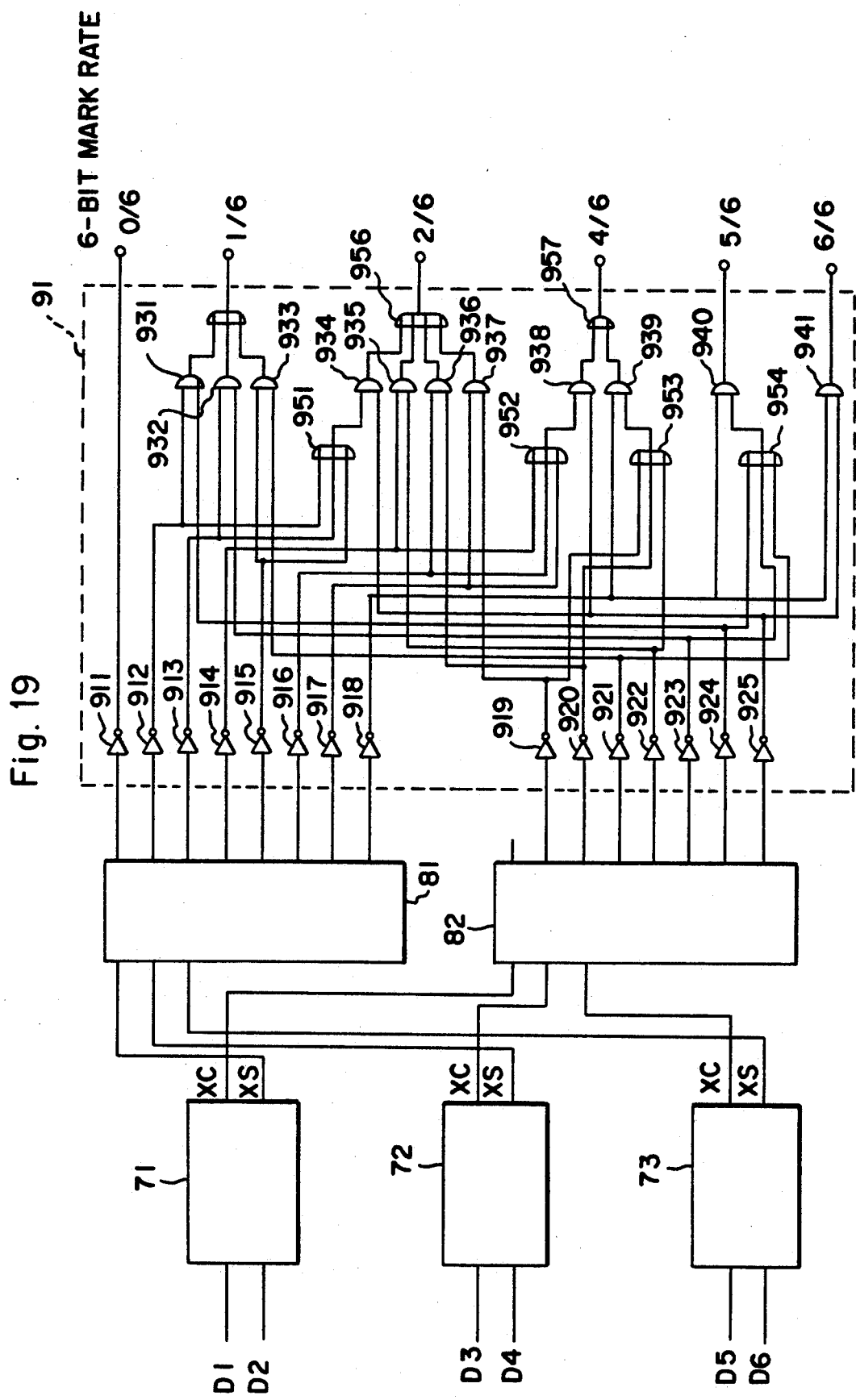
FIG. 19 is a circuit diagram indicating a practical example of the 6-bit mark rate deciding circuit of FIG. 15.

The 6-bit mark rate deciding circuit 91 is formed, as indicated practically in FIG. 19, by 15 inverters 911~925, 11 AND circuits 931~941 and seven OR circuits 951~957 and detects 6-bit mark rates by logical operations of the logical value signals of 32 patterns to be outputted from the first and second 3:8 decoders 81, 82. In practice, the inverters 911~925 invert polarity of logical value signals outputted from the decoders 81, 82 and the AND circuits 931~941 and OR circuits 951~957 result in the logical product and logical sum of the polarity-inverted signals.

An output of the inverter 911 is detected as 6-bit mark rate 0/6, an output of OR circuit 955 is detected as 6-bit mark rate 1/6, an output of OR circuit 956 is detected as 6-bit mark rate 2/6, an output of OR circuit 957 is detected as 6-bit mark rate 4/6, an output of OR circuit 957 is detected as 6-bit mark rate 4/6, an output of AND circuit 940 is detected as 6-bit mark rate 5/6 and an output of AND circuit 941 is detected as 6-bit mark rate 6/6, respectively. When these six mark rates are not detected completely, the 6-bit mark rate 3/6 is detected.

FIG. 20 shows relationship between the logical values of decoder and 6-bit mark rates, with the relationship between the 5B6B code signals D1~D6 and output signals of the mark rate detecting circuits. The mark rates 1/6, 2/6, 4/6 and 5/6 are representative examples and other mark rates are also detected.

According to modification examples, a number of detected patterns can be reduced to about 20 patterns which are about 1/3 of the conventional patterns and thereby the circuit structure can be scaled down. Moreover, with simplification of the circuits, cost reduction can be realized through reduction of power consumption.

The present invention is limited only by the scope of the appended claims.

We claim:

1. A 5B6B coding rule inverse conversion circuit in a data transmission system utilizing the 5B6B code as a code format on a transmission line, comprising:
   a first decoder for generating a signal of eight patterns from the upper three bits in a six bit signal which has been converted by the 5B6B coding rule conversion method;
   a second decoder for generating a signal of eight patterns from the lower three bits in the six bits;
   a mark rate detecting circuit for detecting a mark rate of six bits from the signal of eight patterns outputted from the first and second decoders;
   a code inverse conversion circuit for executing the inverse conversion of the 5B6B coding rule responsive to the mark rates detected by the mark rate detecting circuit in order to convert the six bits into a signal of five bits; and
   a select circuit for selecting and outputting only one signal among the signal of five bits inversely converted by the code inverse conversion circuit, signal of upper five bits among the six bits and an error signal, responsive to the mark rate detected by the mark rate detecting circuit.

2. A mark rate detecting circuit in a data transmission system utilizing the 5B6B code as a code format on a transmission line, comprising:
   a first mark rate detecting circuit for detecting a mark rate of the upper three bits in a six bit signal which has been converted by the 5B6B coding rule conversion method, said first mark rate detecting circuit including a first NOR circuit, an AND circuit, and an EOR circuit receiving in parallel said upper three bits; an inverter connected to receive an output of said EOR circuit; and a second NOR circuit and a third NOR circuit receiving the outputs of said first NOR circuit and said AND circuit; said EOR circuit supplying an output to said second NOR circuit and to said inverter; said inverter supplying its output to said third NOR circuit, such that said third NOR circuit receives a signal corresponding to the inverted output of said EOR circuit;
   a second mark rate detecting circuit for detecting the mark rate of the lower three bits of th six bits, said second mark rate detecting circuit including a first NOR circuit, an AND circuit, and an EOR circuit receiving in parallel said upper three bits; an inverter connected to receive an output of said EOR circuit; and a second NOR circuit and a third NOR circuit receiving the outputs of said first NOR circuit and said AND circuit; said EOR circuit supplying an output to said second NOR circuit and to said inverter; said inverter supplying its output to said third NOR circuit, such that said third NOR circuit receives a signal corresponding to the inverted output of said EOR circuit; and
   a 6-bit mark rate deciding circuit for deciding the mark rate of the six bits, responsive to the mark rate detected by the first mark rate detecting circuit and the second mark rate detecting circuit, said 6-bit mark rate deciding circuit including a plurality of AND circuits disposed in parallel, said plurality of AND circuits being connected to receive outputs of said second and third NOR circuits of said first mark rate detecting circuit and said second and third NOR circuits of said second mark rate detecting circuit, and wherein one of said plurality of AND circuits receives the output from said first NOR circuit of said first mark rate detecting circuit, and wherein another one of said plurality of AND circuits receives the output from said first NOR circuit of said second mark rate detecting circuit.

3. A 5B6B coding rule inverse conversion circuit in a data transmission system utilizing the 5B6B code as a code format on a transmission line, comprising:
   a first two bit mark rate detecting circuit for detecting a mark rate of upper two bits in a six bits signal which has been converted by the 5B6B coding rule conversion method and separately outputting an upper bit and a lower bit of said upper two bits in the six bits signal;
   a second two bit mark rate detecting circuit for detecting the mark rate of intermediate two bits of the six bits and separately outputting an upper bit and a lower bit of said intermediate two bits in the six bits signal;
   a third two bit mark rate detecting circuit for detecting the mark rate of lower two bits for the six bits and separately outputting an upper bit and a lower bit of said lower two bits in the six bits signal;
   a first decoder having three input terminals respectively receiving the upper bit separately output from each of said first, second, and third two bit mark rate detecting circuits, for generating a logical signal of eight patterns from the logical signal of the upper bit of respective 2-bit logical signals detected by each of said first, second, and third two bit mark rate detecting circuits, indicating the mark rate detected by each of said first, second, and third two bit mark rate detecting circuits;
   a second decoder having three input terminals respectively receiving the lower bit separately output from each of said first, second, and third two bit mark rate detecting circuits, for generating the logical signal of eight patterns from the logical signal of the lower bit of the respective 2-bit logical signals detected by each of said first, second, and third two bit mark rate detecting circuits, indicating the mark rate; and
   a 6-bit mark rate deciding circuit for deciding mark rates of the six bits, responsive to a total of 16 patterns generated by the first and second decoders.

* * * * *